United States Patent
Kim et al.

(10) Patent No.: US 10,203,479 B2
(45) Date of Patent: Feb. 12, 2019

(54) IMAGE PICKUP LENS

(71) Applicant: LG INNOTEK CO., LTD., Seoul (KR)

(72) Inventors: Jin Young Kim, Seoul (KR); Duk Keun Kwon, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 69 days.

(21) Appl. No.: 15/192,564

(22) Filed: Jun. 24, 2016

(65) Prior Publication Data

US 2016/0306139 A1 Oct. 20, 2016

Related U.S. Application Data

(63) Continuation of application No. 14/341,299, filed on Jul. 25, 2014, now Pat. No. 9,383,551.

(30) Foreign Application Priority Data

Jul. 25, 2013 (KR) .................. 10-2013-0087781

(51) Int. Cl.
| | |
|---|---|
| G02B 13/00 | (2006.01) |
| H04N 5/225 | (2006.01) |
| G02B 5/20 | (2006.01) |
| G02B 9/12 | (2006.01) |
| G02B 27/00 | (2006.01) |

(52) U.S. Cl.
CPC ......... *G02B 13/0035* (2013.01); *G02B 5/208* (2013.01); *G02B 9/12* (2013.01); *G02B 27/0025* (2013.01); *H04N 5/2253* (2013.01); *H04N 5/2254* (2013.01); *H04N 5/2257* (2013.01)

(58) Field of Classification Search
CPC ...... G02B 13/0035; G02B 9/12; G02B 5/208; G02B 27/0025; H04N 5/2253; H04N 5/2254; H04N 5/2257

USPC .......................................... 359/716, 784, 791
See application file for complete search history.

(56) References Cited

U.S. PATENT DOCUMENTS

| 2011/0096221 A1 | 4/2011 | Tsai | |
|---|---|---|---|
| 2011/0273611 A1* | 11/2011 | Matsusaka | G02B 13/0045 348/345 |
| 2014/0043694 A1* | 2/2014 | Tsai | G02B 3/04 359/708 |

FOREIGN PATENT DOCUMENTS

| CN | 102937741 A | 2/2013 |
|---|---|---|
| KR | 10-2008-0062155 A | 7/2008 |
| KR | 10-0849775 B | 7/2008 |
| KR | 10-1197901 B | 10/2012 |
| TW | 201300826 A1 | 1/2013 |

OTHER PUBLICATIONS

Office Action dated Aug. 22, 2017 in Chinese Application No. 201410359888.8, with its English Translation.

* cited by examiner

*Primary Examiner* — Jordan Schwartz
*Assistant Examiner* — George G King
(74) *Attorney, Agent, or Firm* — Salwanchik, Lloyd & Eisenschenk

(57) ABSTRACT

Embodiments relate to an image pickup lens including a first lens having both convex surfaces, a second lens in the form of a positive meniscus lens and a third lens in the form of a negative meniscus lens, the first lens to the third lens being arranged in sequence from an object side to an image side. The first lens to the third lens are formed of the same material.

22 Claims, 10 Drawing Sheets

IMAGE PICKUP LENS

CROSS-REFERENCES TO RELATED APPLICATION

This application is a continuation of U.S. application Ser. No. 14/341,299, filed Jul. 25, 2014, which claims the benefit under 35 U.S.C. § 119 of Korean Patent Application No. 10-2013-0087781, filed Jul. 25, 2013, which are herein incorporated by reference in their entirety.

BACKGROUND

Technical Field

Embodiments relate to an image pickup lens and, more particularly, to an image pickup lens, constituent lenses of which have the same index of refraction and achieve a compact size and enhanced performance.

Related Art

The Recently, conventional film cameras have been replaced with camera modules for portable terminals using a compact solid-state image pickup device (e.g., a Charge Coupled Device (CCD) or a Complementary Metal Oxide Semiconductor (CMOS)), Digital Still Cameras (DSCs), camcorders, PC cameras (i.e. image pickup apparatuses attached to personal computers) and the like. These image pickup apparatuses are gradually becoming leaner and smaller.

With this tendency, although a light receiving device, such as a CCD, mounted in a compact image pickup apparatus is being made smaller, an image pickup lens of the image pickup apparatus still occupies the largest volume of the image pickup apparatus.

Thus, the major issue with regard to a leaner and smaller configuration of the image pickup apparatus is the image pickup lens that forms an image of an object.

Here, problems are not only to merely realize a compact size of the image pickup lens, but also to achieve high performance of the image pickup lens corresponding to high performance of the light receiving device.

However, the compact image pickup lens is inevitably located close to the light receiving device, which problematically causes light to be obliquely incident on an image surface of the image pickup apparatus. This results in insufficient light concentration of the image pickup lens as well as extreme variation in the brightness of an image from the center to the periphery of the image.

Increasing the number of lenses in consideration of the above-described problems, however, inevitably increases the size of the image pickup apparatus and this is also disadvantageous in terms of costs.

Therefore, there is a need to achieve a high performance image pickup lens in consideration of manufacturing cost.

BRIEF SUMMARY

Embodiments provide an image pickup lens having a compact size and enhanced performance.

In one embodiment, an image pickup lens includes a first lens having both convex surfaces, a second lens in the form of a positive meniscus lens and a third lens in the form of a negative meniscus lens, the first lens, the second lens and the third lens being arranged in sequence from an object side to an image side, wherein the first lens to the third lens are formed of the same material.

In another embodiment, an image pickup lens includes a first lens in the form of a positive power lens, the first lens having both convex surfaces, a second lens in the form of a positive power lens and a third lens in the form of a negative power lens, the first lens, the second lens and the third lens being arranged in sequence from an object side to an image side, wherein the first lens to the third lens have the same index of refraction, and wherein power of the second lens is greater than power of the first lens and the third lens.

The first lens to the third lens may have the same index of refraction.

At least one of the first lens to the third lens may be a plastic lens.

At least one of the first lens to the third lens may have one or both aspherical surfaces.

The image pickup lens may further include a stop provided between the first lens and the second lens.

The image pickup lens may satisfy the following equation 1:

$$0.7 < f/f1 < 1.6 \quad \text{<Equation 1>}$$

where, f is a focal distance of the entire optical system and f1 is a focal distance of the first lens.

The image pickup lens may satisfy the following equation 2:

$$0.8 < f/f2 < 1.5 \quad \text{<Equation 2>}$$

where, f is a focal distance of the entire optical system and f2 is a focal distance of the second lens.

The image pickup lens may satisfy the following equation 3:

$$-1.6 < f/f3 < -0.5 \quad \text{<Equation 3>}$$

where, f is a focal distance of the entire optical system and f3 is a focal distance of the third lens.

The image pickup lens may satisfy the following equation 4:

$$0.5 < R1/f < 0.7 \quad \text{<Equation 4>}$$

where, R1 is a radius of curvature of an object surface of the first lens and f is a focal distance of the entire optical system.

The image pickup lens may satisfy the following equation 5:

$$-0.06 < R1/R2 < -0.01 \quad \text{<Equation 5>}$$

where, R1 is a radius of curvature of an object surface of the first lens and R2 is a radius of curvature of an image surface of the first lens.

The image pickup lens may satisfy the following equation 6:

$$-0.4 < R6/R5 < 0.2 \quad \text{<Equation 6>}$$

where, R5 is a radius of curvature of an object surface of the third lens and R6 is a radius of curvature of an image surface of the third lens.

The image pickup lens may satisfy the following equation 7:

$$0.6 < \tan\theta < 0.8 < \quad \text{Equation 7>}$$

where, θ is a half field angle of a maximum image height.

In still another embodiment, a camera module includes an image pickup lens including a first lens in the form of a positive power lens, the first lens having both convex surfaces, a second lens in the form of a positive power lens and a third lens in the form of a negative power lens, the first lens, the second lens and the third lens being arranged in sequence from an object side to an image side, wherein the first lens to the third lens are formed of the same material, and wherein power of the second lens is greater than power of the first lens and the third lens, a filter configured to selectively transmit light having passed through the image pickup lens based on a wavelength of the light and a light receiving device configured to receive light having passed through the filter.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
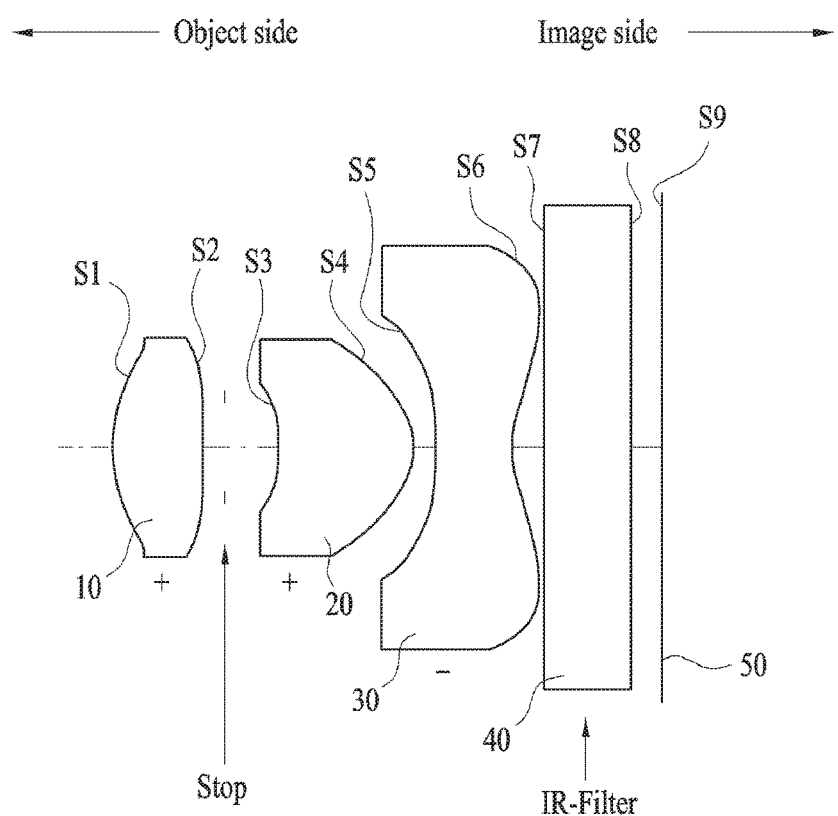
FIG. 1 is a view showing a configuration of an image pickup lens module according to a first embodiment.

Hereinafter, embodiments will be clearly revealed via the following description with reference to the annexed drawings.

All terms provided in this specification have the same meanings as generally understood by a person having ordinary skill in the art unless mentioned otherwise. When terms provided in this specification conflict with generic meaning of the corresponding terms, the terms should be construed based on definitions provided in this specification.

It should be understood that the following description of the disclosure are intended to explain embodiments and not intended to limit the scope of the disclosure and the same reference numerals throughout the specification designate the same or similar elements.

In the following description of a configuration of each lens, "object surface" refers to a surface of the lens facing an object side on the basis of the optical axis, and "image surface" refers to a surface of the lens facing an image side on the basis of the optical axis.

In addition, "positive power of the lens" refers to a converging lens that converges parallel beams and "negative power of the lens" refers to a diverging lens that diverges parallel beams.

With regard to features of the disclosure, hereinafter, five types of lenses will be described respectively with reference to FIGS. 1 to 5 and then embodiments regarding the respective types of lenses will be described in detail with reference to FIGS. 6 to 10.

FIG. 1 is a view showing a configuration of an image pickup lens module according to a first embodiment.

Referring to FIG. 1, the image pickup lens according to the first embodiment includes a first lens 10, a second lens 20 and a third lens 30 arranged in sequence from an object side to an image side. A stop may be provided between the first lens 10 and the second lens 20, and a filter 40 and a light receiving device 50 may be arranged in sequence. As such, an image pickup lens to be included in a camera module may be constructed.

The light receiving device 50 may be an image sensor, and a horizontal length and/or a vertical length of a unit pixel of the image sensor may be 2 μm or less. The above-described embodiment and the following embodiments may provide an image pickup lens that may be applied to a camera module having a lot of pixels and/or a high resolution. The aforementioned camera module may include an image sensor or light receiving device having a lot of pixels and/or a high resolution and, in this case, a horizontal length and/or a vertical length of a unit pixel may be 2 μm or less.

In FIG. 1, "S1" is an object surface of the first lens 10, "S2" is an image surface of the first lens 10, "S3" is an object surface of the second lens 20, "S4" is an image surface of the second lens 20, "S5" is an object surface of the third lens 30 and "S6" is an image surface of the third lens 30.

These reference characters "Sx" may be equally applied to other embodiments shown in FIGS. 2 to 5.

The object surfaces of the lenses have shapes as follows. The first lens 10 has a convex object surface, the second lens 20 has a concave object surface, and the third lens 30 has a convex object surface near the optical axis.

The image surfaces of the lenses have shapes as follows. The first lens 10 has a convex image surface, the second lens 20 has a convex image surface, and the third lens 30 has an image surface that is concave near the optical axis.

That is, the first lens 10 has convex object and image surfaces, the second lens 20 is a positive meniscus lens having a concave object surface and a convex image surface, and the third lens 30 is a negative meniscus lens having a convex object surface and a concave image surface near the optical axis.

In addition, the first lens 10 is a positive power lens, the second lens 20 is a positive power lens and the third lens 30 is a negative power lens.

Here, power of the second lens 20 may be greater than power of the first lens 10 and the third lens 30.

In particular, the third lens 30 has the concave image surface near the optical axis and the periphery of the concave image surface is convexed, which is advantageous in terms of curvature of field and telecentricity. Moreover, this shape allows a beam to be introduced into the lens at an angle close to a right angle within a range from the center to the periphery of the image surface (near the optical axis).

At least one of the first lens 10, the second lens 20 and the third lens 30 as described above may have one or both aspherical surfaces. This is because providing any one of the first lens 10, the second lens 20 and the third lens 30 with at least one aspherical surface may achieve excellent effects with regard to correction of various aberrations, more particularly, spherical aberration, coma aberration and distortion.

In addition, the first lens 10, the second lens 20 and the third lens 30 may be formed of the same material to assure easy power distribution of the respective lenses.

In particular, at least one of the first lens 10, the second lens 20 and the third lens 30 may be a plastic lens fabricated by injection molding.

A glass lens requires a high press temperature for lens formation because of a relatively high transition point thereof and, therefore, a mold therefor may be easily deformed. In addition, increased mold replacement times problematically increases fabrication cost of the glass lens. On the other hand, the plastic lens fabricated by injection molding has none of the problems associated with fabrication of the glass lens and is advantageous in terms of easy formation of an aspherical lens surface and fabrication of a compact lens.

Note that a surface of the lens provided herein is coated for anti-reflection or enhanced surface hardness.

Meanwhile, an arrangement in which the first lens 10, the second lens 20 and the third lens 30 have positive, positive and negative power in order is an optimal power arrangement that is set in consideration of optical performance and manufacturing cost of the image pickup lens and realization of a compact image pickup apparatus.

The first lens 10 may satisfy the following equation 1.

$$0.7 < f/f1 < 1.6 \qquad \text{<Equation 1>}$$

where, f is a focal distance of the entire optical system and f1 is a focal distance of the first lens 10.

The above equation 1 defines a condition range to impede performance deterioration, mainly caused by fabrication errors, with regard to the first lens 10 having relatively weak power.

More specifically, when exceeding the above range, the power of the first lens 10 becomes strong, thus increasing various aberrations caused by the first lens 10 and causing an increased aberration correction burden of the second lens 20 and the third lens 30.

The second lens 20 may satisfy the following equation 2.

$$0.8 < f/f2 < 1.5 \qquad \text{<Equation 2>}$$

where, f is a focal distance of the entire optical system and f2 is a focal distance of the second lens 20.

The above equation 2 defines a condition range to impede performance deterioration, mainly caused by fabrication errors, with regard to the second lens 20 having relatively strong power.

More specifically, when exceeding the above range, power balance between the respective lenses is broken and it is difficult to achieve a compact and high performance image pickup lens.

The third lens 30 may satisfy the following equation 3.

$$-1.6 < f/f3 < -0.5 \qquad \text{<Equation 3>}$$

where, f is a focal distance of the entire optical system and f3 is a focal distance of the third lens 30.

The above equation 3 defines a condition range to impede performance deterioration mainly caused by a coma aberration.

More specifically, when exceeding the above range, power balance between the respective lenses is broken and it is difficult to achieve a compact and high performance image pickup lens.

It is desirable that the equation 1 to the equation 3 be simultaneously satisfied.

Meanwhile, the lenses provided herein may satisfy the following equations with regard to a radius of curvature.

$$0.5 < R1/f < 0.7 \qquad \text{<Equation 4>}$$

$$-0.06 < R1/R2 < -0.01 \qquad \text{<Equation 5>}$$

$$-0.4 < R6/R5 < 0.2 \qquad \text{<Equation 6>}$$

where, R1 is a radius of curvature of the object surface S1 of the first lens 10, R2 is a radius of curvature of the image surface S2 of the first lens 10, R5 is a radius of curvature of the object surface S5 of the third lens 30, R6 is a radius of curvature of the image surface S6 of the third lens 30, and f is a focal distance of the entire optical system.

By satisfying the respective equations with regard to radii of curvature of the lenses provided herein, aberration correction is implemented with regard to a field angle of each lens. That is, as an incident angle of flux in an image pickup device is controlled to a constant angle, imbalance in the density of flux at an image surface may be reduced.

In the above equation 4, R1/f is a value above zero and below 1. When this range is satisfied, a shape of the first lens 10 for a compact image pickup lens and power distribution may be easily achieved.

In the above equation 5, R1/R2 has a value below zero. When this range is satisfied, a compact image pickup lens may be achieved. More specifically, increasing a curvature of the object surface of the first lens 10 with decreasing distance to the top may result in an increased degree of freedom with regard to a curvature of the remaining lenses in the image pickup lens having a limited length for compactness.

In the above equation 6, an absolute value of R6/R5 is below 1. When this range is satisfied, a shape of the third lens 30 to allow light to be introduced to the surface of the third lens 30 in a tangential direction may be easily achieved, which may reduce an aberration.

It is desirable that the equation 4 to the equation 6 be simultaneously satisfied.

Meanwhile, that the image pickup lens of the disclosure satisfies the following equation 7 is advantageous in terms of balance between the lenses.

$$0.6 < \tan \theta < 0.8 \qquad \text{<Equation 7>}$$

where, θ is a half field angle of a maximum image height.

Meanwhile, considering a position of the stop relative to the first lens 10 to the third lens 30, the stop may be located above an object to achieve telecentricity. In addition, the stop may be located between the image surface of the first lens 10 and the object surface of the second lens 20.

Meanwhile, the filter 40 may be an optical member, for example, a flat plate shaped optical member, such as a cover glass for protection of the image surface, an infrared filter or the like. The light receiving device 50 may be an image sensor disposed on a printed circuit board (not shown).

The image pickup lens according to the first embodiment shown in FIG. 1 having the above-described features may have detailed features as represented in the following table 1 and table 2.

Here, table 1 represents lens data regarding each lens surface and table 2 represents a Koenig constant k and aspherical surface coefficients A to E of each lens surface. In table 1 and table 2, "*" designates an aspherical surface.

TABLE 1

| Sx | Radius of Curvature (R) | Thickness or Distance (d) | Index of Refraction (N) | Abbe Number (vd) |
|---|---|---|---|---|
| 1* | 1.0000 | 0.415 | 1.53 | 56.5 |
| 2* | −20.0000 | 0.100 | | |
| Stop | Infinity | 0.242 | 1.53 | 56.5 |
| 3* | −1.1466 | 0.610 | | |
| 4* | −0.5073 | 0.100 | 1.53 | 56.5 |
| 5* | −5.5044 | 0.354 | | |

TABLE 1-continued

| Sx | Radius of Curvature (R) | Thickness or Distance (d) | Index of Refraction (N) | Abbe Number (vd) |
|---|---|---|---|---|
| 6* | 0.8103 | 0.142 | 1.52 | 54.5 |
| 7 | Infinity | 0.400 | | |
| 8 | Infinity | 0.095 | | |
| Image sensor | Infinity | 0.041 | | |

TABLE 2

| Sx | k | A | B | C | D | E |
|---|---|---|---|---|---|---|
| 1* | −0.22058 | −0.09741 | −0.14192 | −0.54464 | −5.08714 | 3.51683 |
| 2* | 0.00000 | −0.27906 | −0.92548 | 1.00231 | 0.16230 | −0.38292 |
| 3* | 0.26340 | −1.20012 | 0.01391 | −30.75299 | 124.69855 | 195.34033 |
| 4* | −1.10998 | 0.52855 | −7.19480 | 32.54181 | −82.30582 | 91.19558 |
| 5* | 0.00000 | −0.88762 | −0.09480 | 3.48596 | −6.10504 | 2.22288 |
| 6* | −4.17723 | −0.63487 | 0.85859 | −0.78629 | 0.32075 | −0.06604 |

Figure 6:
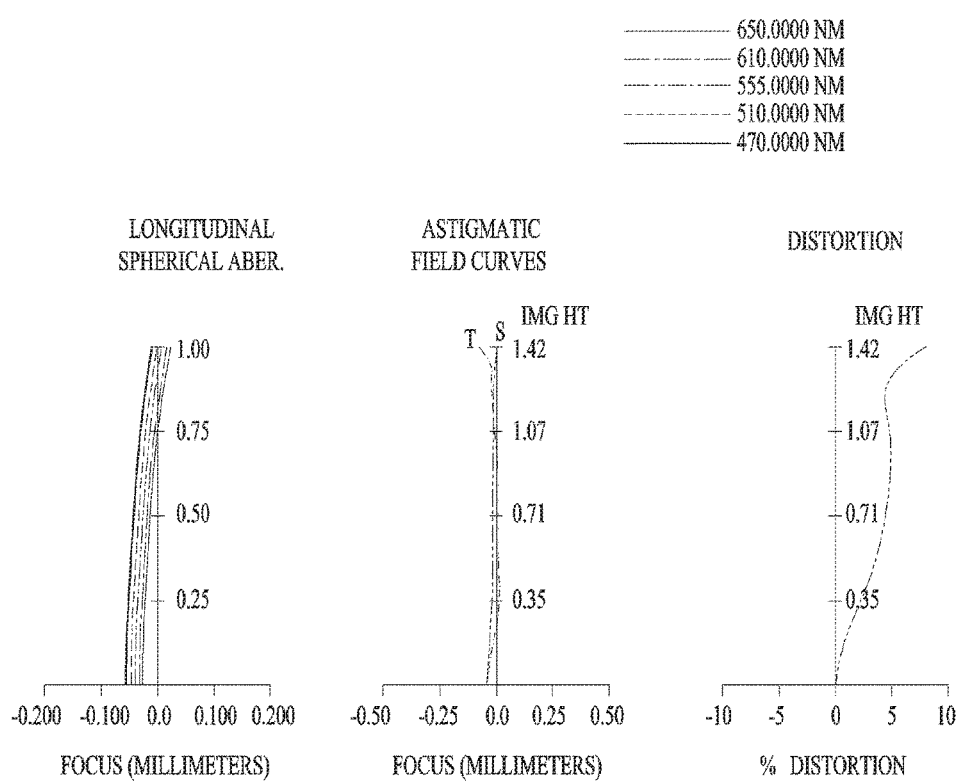
FIG. 6 is a graph showing aberrations according to the first embodiment shown in FIG. 1.

FIG. 6 is a graph showing aberrations according to the first embodiment. In the graph, longitudinal spherical aberration, astigmatism and distortion are shown from the left in sequence.

In FIG. 6, the Y-axis refers to a size of an image and the X-axis refers to a focal distance (mm) and distortion (%). Curves of FIG. 6 are interpreted as having a higher aberration correction function with decreasing distance to the Y-axis.

More specifically, in FIG. 6, a longitudinal spherical aberration is within a range of −0.060 mm to +0.025 mm, astigmatism is within a range of −0.121 mm to +0.03 mm and distortion is within a range of 0% to +8.1%. The image pickup lens according to the first embodiment exhibits excellent numerical values of a longitudinal spherical aberration, astigmatism and distortion because image values are close to the Y-axis in almost all fields.

Figure 2:
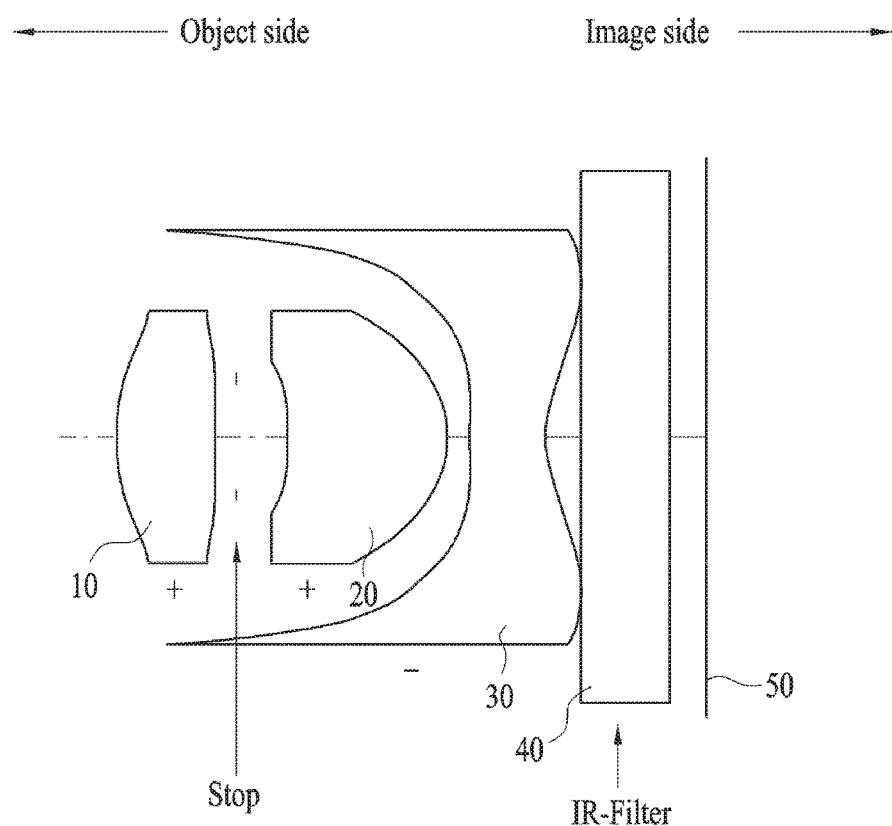
FIG. 2 is a view showing a configuration of an image pickup lens module according to a second embodiment.

FIG. 2 is a view showing a configuration of an image pickup lens module according to a second embodiment.

Referring to FIG. 2, except for slight shape differences, the same features of the respective lenses and the same equations as those of the image pickup lens according to the first embodiment shown in FIG. 1 are applied.

The image pickup lens according to the second embodiment shown in FIG. 2 having the above-described features may have detailed features as represented in the following table 3 and table 4.

Here, table 3 represents lens data regarding each lens surface and table 4 represents a Koenig constant k and aspherical surface coefficients A to E of each lens surface. In table 3 and table 4, "*" designates an aspherical surface.

TABLE 3

| Sx | Radius of Curvature (R) | Thickness or Distance (d) | Index of Refraction (N) | Abbe Number (vd) |
|---|---|---|---|---|
| 1* | 1.2000 | 0.451 | 1.53 | 56.5 |
| 2* | −40.0000 | 0.100 | | |
| Stop | Infinity | 0.231 | 1.53 | 56.5 |
| 3* | −1.6512 | 0.734 | | |
| 4* | −0.5831 | 0.100 | 1.53 | 56.5 |

TABLE 3-continued

| Sx | Radius of Curvature (R) | Thickness or Distance (d) | Index of Refraction (N) | Abbe Number (vd) |
|---|---|---|---|---|
| 5* | 4.4787 | 0.352 | | |
| 6* | 0.6832 | 0.163 | 1.52 | 54.5 |
| 7 | Infinity | 0.400 | | |
| 8 | Infinity | 0.157 | | |
| Image sensor | Infinity | 0.010 | | |

TABLE 4

| Sx | k | A | B | C | D | E |
|---|---|---|---|---|---|---|
| 1* | 0.23969 | −0.06312 | −0.10784 | 0.03389 | −3.98794 | 4.52810 |
| 2* | 0.00000 | −0.13479 | −0.96231 | 0.70107 | 1.43487 | 5.42855 |
| 3* | −0.29112 | −0.76014 | −2.90901 | −22.62070 | 153.24376 | −64.04640 |
| 4* | −0.81839 | 0.22735 | −6.60502 | 35.16093 | −95.72353 | 98.37479 |
| 5* | 0.00000 | −1.30457 | −0.81527 | 4.19577 | −3.10202 | 0.00000 |
| 6* | −2.62278 | −0.77957 | 0.91902 | −0079340 | 0.41116 | −0.10237 |

Figure 7:
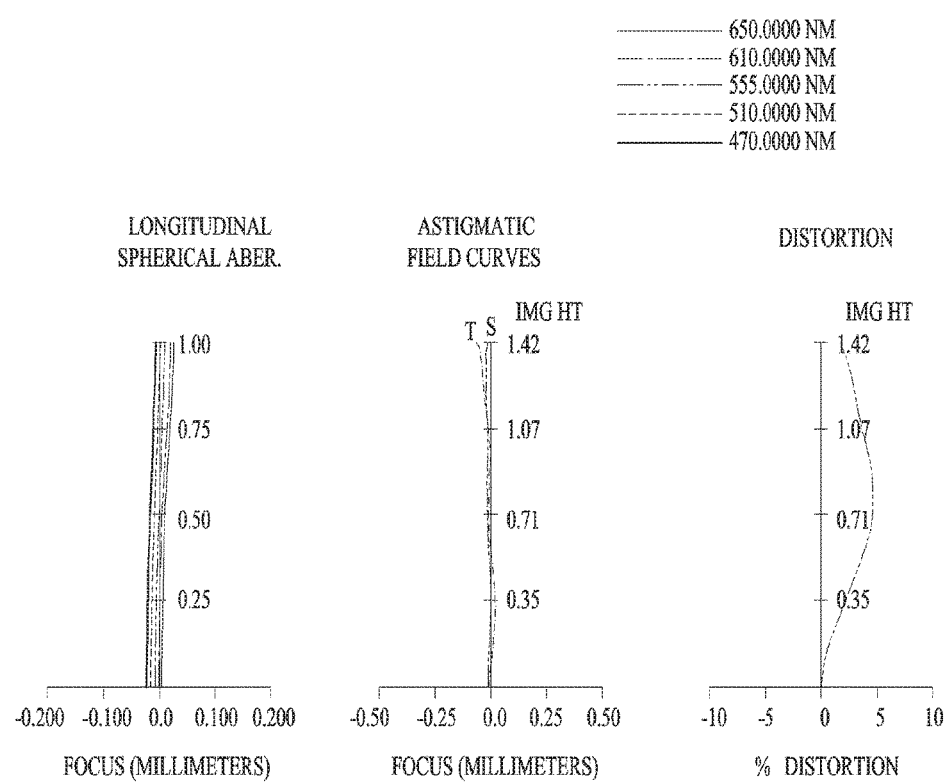
FIG. 7 is a graph showing aberrations according to the second embodiment shown in FIG. 2.

FIG. 7 is a graph showing aberrations according to the second embodiment. In the graph, a longitudinal spherical aberration, astigmatism and distortion are shown from the left in sequence.

In FIG. 7, the Y-axis refers to a size of an image and the X-axis refers to a focal distance (mm) and distortion (%). Curves of FIG. 7 are interpreted as having a higher aberration correction function with decreasing distance to the Y-axis.

More specifically, in FIG. 7, a longitudinal spherical aberration is within a range of −0.030 mm to +0.010 mm, astigmatism is within a range of −0.011 mm to +0.029 mm and distortion is within a range of 0%/o to +4.6%. The image pickup lens according to the second embodiment exhibits excellent numerical values of a longitudinal spherical aberration, astigmatism and distortion because image values are close to the Y-axis in almost all fields.

Figure 3:
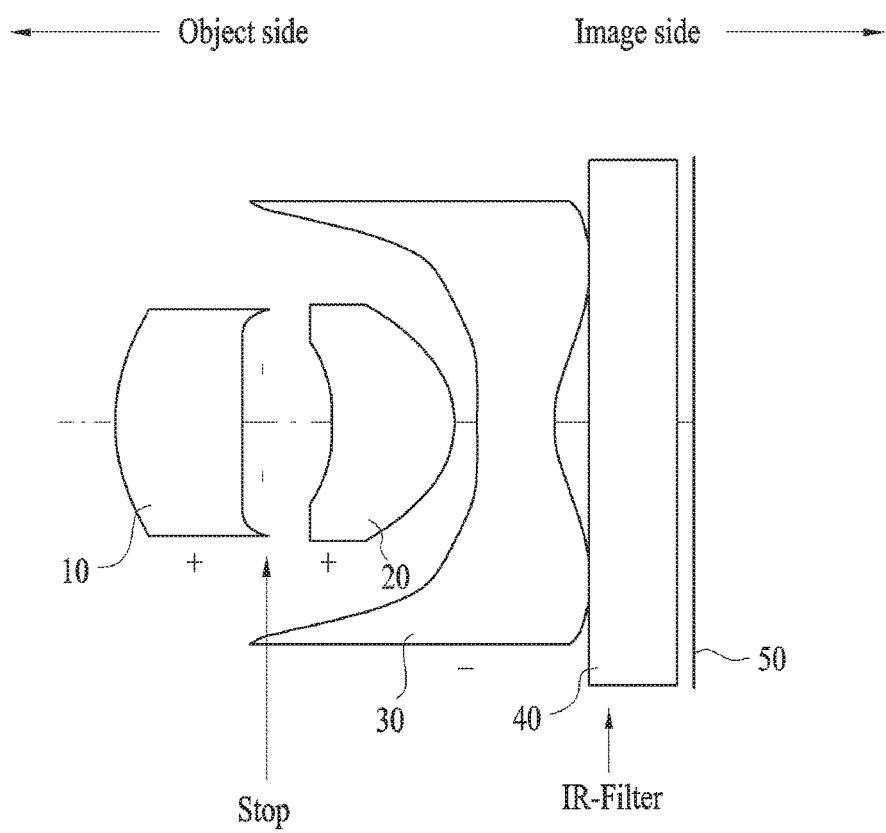
FIG. 3 is a view showing a configuration of an image pickup lens module according to a third embodiment.

FIG. 3 is a view showing a configuration of an image pickup lens module according to a third embodiment.

Referring to FIG. 3, except for slight shape differences, the same features of the respective lenses and the same equations as those of the image pickup lens according to the first embodiment shown in FIG. 1 are applied.

The image pickup lens according to the third embodiment shown in FIG. 3 having the above-described features may have detailed features as represented in the following table 5 and table 6.

Here, table 5 represents lens data regarding each lens surface and table 6 represents a Koenig constant k and aspherical surface coefficients A to E of each lens surface. In table 5 and table 6, "*" designates an aspherical surface.

TABLE 5

| Sx | Radius of Curvature (R) | Thickness or Distance (d) | Index of Refraction (N) | Abbe Number (vd) |
|---|---|---|---|---|
| 1* | 1.1847 | 0.593 | 1.53 | 56.5 |
| 2* | −64.0000 | 0.100 | | |
| Stop | Infinity | 0.312 | 1.53 | 56.5 |
| 3* | −1.5126 | 0.569 | | |
| 4* | −0.5115 | 0.110 | 1.53 | 56.5 |
| 5* | 305.7291 | 0.350 | | |
| 6* | 0.6475 | 0.166 | 1.52 | 54.5 |
| 7 | Infinity | 0.400 | | |
| 8 | Infinity | 0.054 | | |
| image sensor | Infinity | 0.025 | | |

TABLE 6

| Sx | k | A | B | C | D | E |
|---|---|---|---|---|---|---|
| 1* | −0.42727 | −0.01345 | −0.10213 | 1.03775 | −3.59266 | 3.38099 |
| 2* | .00000 | 0.04876 | −0.60114 | 1.34124 | −31.31626 | 146.79033 |
| 3* | −5.38004 | −1.05359 | −0.13066 | −27.11245 | 112.56587 | 25.26501 |
| 4* | −1.00419 | 0.50806 | −6.80090 | 31.35831 | −87.96181 | 101.59358 |
| 5* | .00000 | −1.07746 | 0.13282 | 4.05805 | −5.89792 | 2.23623 |
| 6* | −4.49510 | −0.56671 | 0.74440 | −0.67203 | 0.33786 | −0.07615 |

Figure 8:
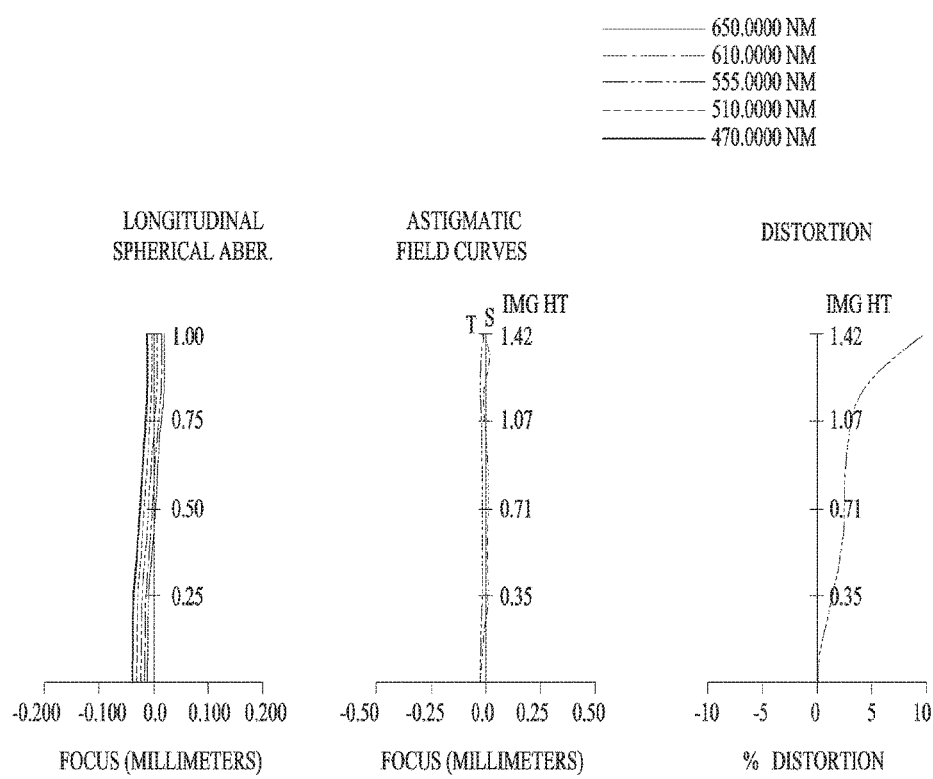
FIG. 8 is a graph showing aberrations according to the third embodiment shown in FIG. 3.

FIG. 8 is a graph showing aberrations according to the third embodiment. In the graph, a longitudinal spherical aberration, astigmatism and distortion are shown from the left in sequence.

In FIG. 8, the Y-axis refers to a height of an image and the X-axis refers to a focal distance (mm) and distortion (%). Curves of FIG. 8 are interpreted as having a higher aberration correction function with decreasing distance to the Y-axis.

More specifically, in FIG. 8, a longitudinal spherical aberration is within a range of −0.046 mm to +0.017 mm, astigmatism is within a range of −0.031 mm to +0.032 mm and distortion is within a range of 0% to +10.0%. The image pickup lens according to the third embodiment exhibits excellent numerical values of a longitudinal spherical aberration, astigmatism and distortion because image values are close to the Y-axis in almost all fields.

Figure 4:
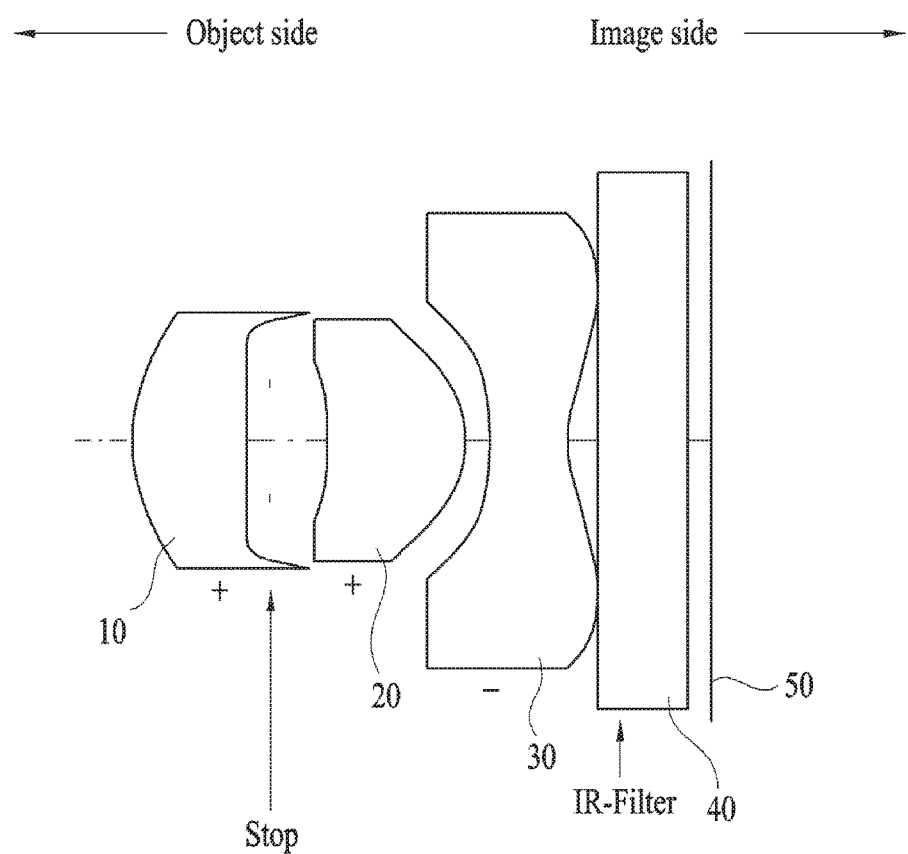
FIG. 4 is a view showing a configuration of an image pickup lens module according to a fourth embodiment.

FIG. 4 is a view showing a configuration of an image pickup lens module according to a fourth embodiment.

Referring to FIG. 4, except for slight shape differences, the same features of the respective lenses and the same equations as those of the image pickup lens according to the first embodiment shown in FIG. 1 are applied.

The image pickup lens according to the fourth embodiment shown in FIG. 4 having the above-described features may have detailed features as represented in the following table 7 and table 8.

Here, table 7 represents lens data regarding each lens surface and table 8 represents a Koenig constant k and aspherical surface coefficients A to E of each lens surface. In table 7 and table 8, "*" designates an aspherical surface.

TABLE 7

| Sx | Radius of Curvature (R) | Thickness or Distance (d) | Index of Refraction (N) | Abbe Number (vd) |
|---|---|---|---|---|
| 1* | 1.0847 | 0.513 | 1.53 | 56.5 |
| 2* | −75.0000 | 0.100 | | |
| Stop | Infinity | 0.256 | 1.53 | 56.5 |
| 3* | −2.1234 | 0.609 | | |
| 4* | −0.5608 | 0.110 | 1.53 | 56.5 |
| 5* | −2.6529 | 0.350 | | |
| 6* | 0.8138 | 0.129 | 1.52 | 54.5 |
| 7 | Infinity | 0.400 | | |

TABLE 7-continued

| Sx | Radius of Curvature (R) | Thickness or Distance (d) | Index of Refraction (N) | Abbe Number (vd) |
|---|---|---|---|---|
| 8 | Infinity | 0.072 | | |
| Image sensor | Infinity | 0.028 | | |

TABLE 8

| Sx | k | A | B | C | D | E |
|---|---|---|---|---|---|---|
| 1* | −0.39903 | −0.00184 | −0.11289 | 0.93044 | −3.80816 | 3.34700 |
| 2* | 0.00000 | 0.02180 | −0.34103 | 2.59422 | −46.44405 | 146.79033 |
| 3* | −12.42691 | −0.84968 | 1.30066 | −2.63840 | 112.21888 | 25.26501 |
| 4* | −1.02365 | .052879 | −6.56635 | 31.98029 | −86.65857 | 104.35214 |
| 5* | 0.00000 | −1.15266 | 0.00435 | 3.99054 | −5.87608 | 2.23940 |
| 6* | −5.46860 | −0.53998 | 0.73218 | −0.67003 | 0.33486 | −0.08210 |

Figure 9:
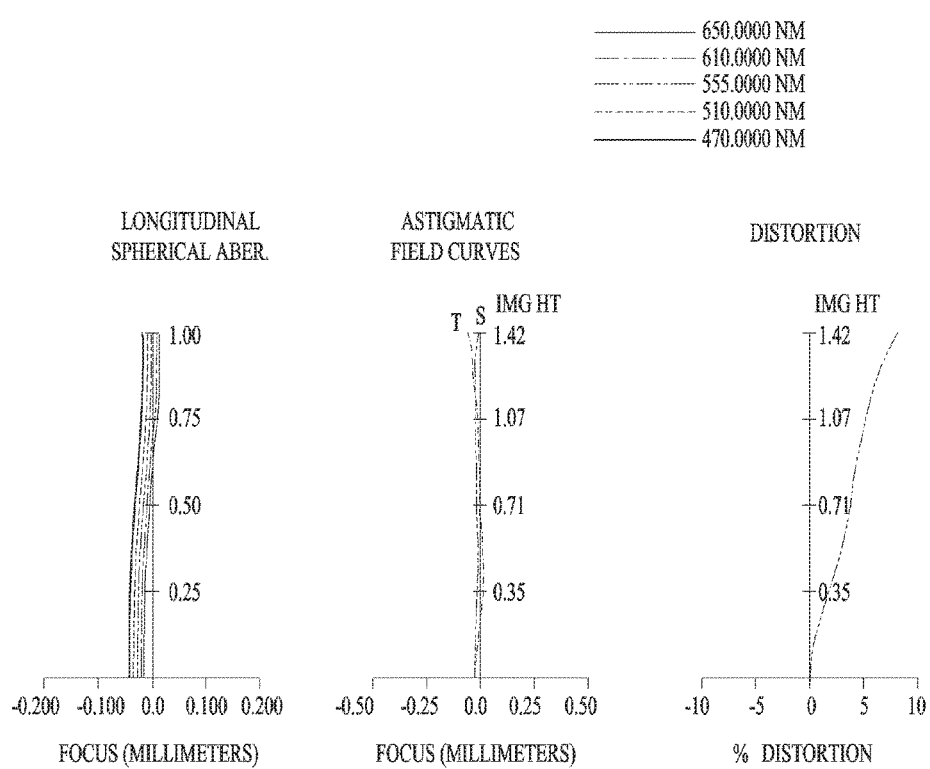
FIG. 9 is a graph showing aberrations according to the fourth embodiment shown in FIG. 4.

FIG. 9 is a graph showing aberrations according to the fourth embodiment. In the graph, a longitudinal spherical aberration, astigmatism and distortion are shown from the left in sequence.

In FIG. 9, the Y-axis refers to a size of an image and the X-axis refers to a focal distance (mm) and distortion (%). Curves of FIG. 9 are interpreted as having a higher aberration correction function with decreasing distance to the Y-axis.

More specifically, in FIG. 9, a longitudinal spherical aberration is within a range of −0.048 mm to +0.013 mm, astigmatism is within a range of −0.082 mm to +0.001 mm and distortion is within a range of 0% to +8.4%. The image pickup lens according to the fourth embodiment exhibits excellent numerical values of a longitudinal spherical aberration, astigmatism and distortion because image values are close to the Y-axis in almost all fields.

Figure 5:
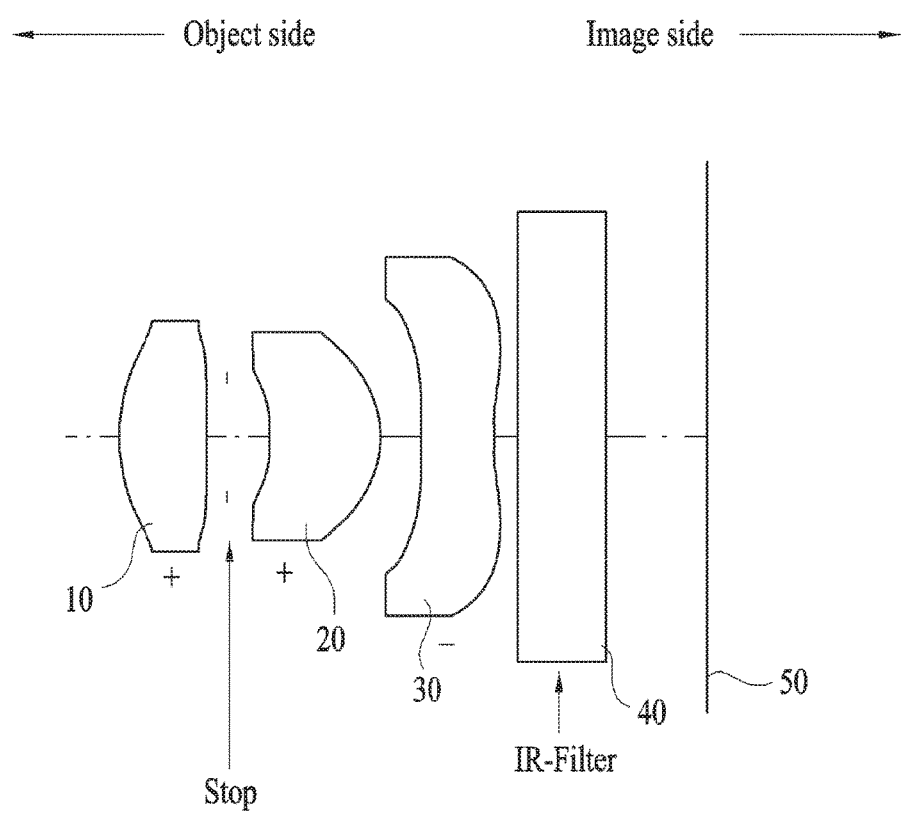
FIG. 5 is a view showing a configuration of an image pickup lens module according to a fifth embodiment.

FIG. 5 is a view showing a configuration of an image pickup lens module according to a fifth embodiment.

Referring to FIG. 5, except for slight shape differences, the same features of the respective lenses and the same equations as those of the image pickup lens according to the first embodiment shown in FIG. 1 are applied.

The image pickup lens according to the fifth embodiment shown in FIG. 5 having the above-described features may have detailed features as represented in the following table 9 and table 10.

Here, table 9 represents lens data regarding each lens surface and table 10 represents a Koenig constant k and aspherical surface coefficients A to E of each lens surface. In table 9 and table 10, "*" designates an aspherical surface.

TABLE 9

| Sx | Radius of Curvature (R) | Thickness or Distance (d) | Index of Refraction (N) | Abbe Number (vd) |
|---|---|---|---|---|
| 1* | 1.1374 | 0.396 | 1.53 | 56.5 |
| 2* | −95.0000 | 0.100 | | |
| Stop | Infinity | 0.188 | 1.53 | 56.5 |
| 3* | −0.9328 | 0.498 | | |
| 4* | −0.5917 | 0.187 | 1.53 | 56.5 |
| 5* | −10.5147 | 0.337 | | |
| 6* | 2.977 | 0.102 | 1.52 | 54.5 |
| 7 | Infinity | 0.400 | | |
| 8 | Infinity | 0.426 | | |
| Image sensor | Infinity | 0.039 | | |

TABLE 10

| Sx | k | A | B | C | D | E |
|---|---|---|---|---|---|---|
| 1* | −0.54329 | 0.00855 | −0.11736 | 0.61026 | −4.79002 | 1.39692 |
| 2* | 0.00000 | −0.05703 | −1.48381 | 6.86563 | −36.26306 | 66.55961 |
| 3* | 0.87830 | −0.91923 | 43.9174 | −6.85949 | 70.56706 | 25.26045 |
| 4* | −0.72914 | 0.35344 | −5.66468 | 33.86951 | −88.40531 | 94.9630 |
| 5* | 0.00000 | −0.47299 | −0.53539 | 2.85336 | −2.77558 | −1.87737 |
| 6* | 3.00517 | −0.68935 | 0.47109 | −0.49436 | 0.30639 | −0.20346 |

Figure 10:
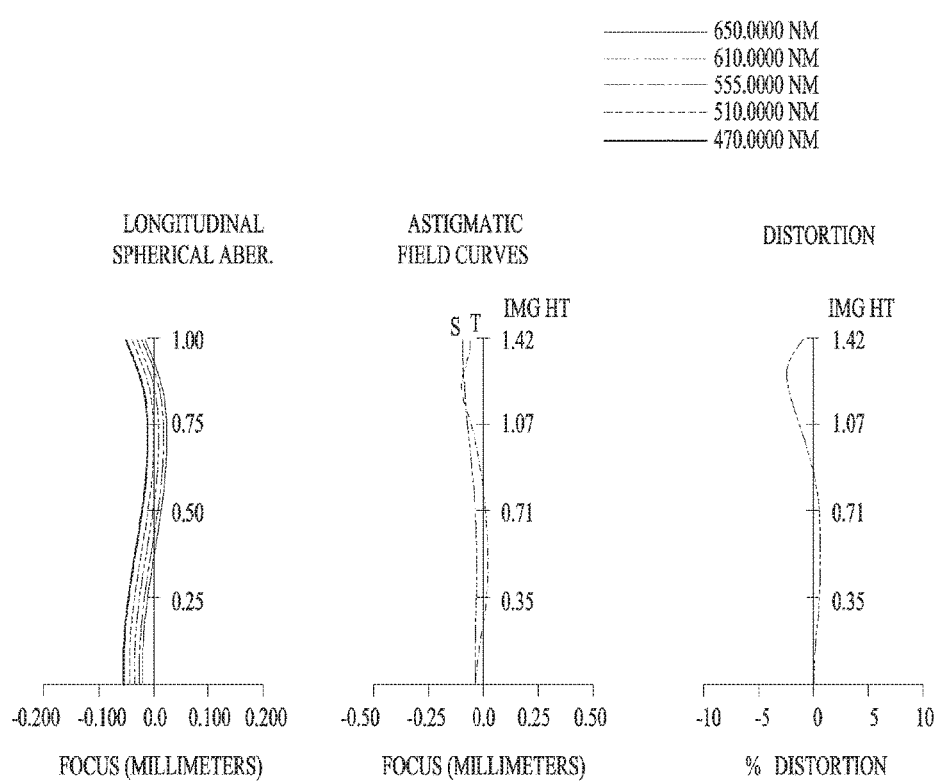
FIG. 10 is a graph showing aberrations according to the fifth embodiment shown in FIG. 5.

FIG. 10 is a graph showing aberrations according to the fifth embodiment. In the graph, a longitudinal spherical aberration, astigmatism and distortion are shown from the left in sequence.

In FIG. 10, the Y-axis refers to a size of an image and the X-axis refers to a focal distance (mm) and distortion (%). Curves of FIG. 10 are interpreted as having a higher aberration correction function with decreasing distance to the Y-axis.

More specifically, in FIG. 10, a longitudinal spherical aberration is within a range of −0.069 mm to +0.025 mm, astigmatism is within a range of −0.121 mm to +0.039 mm and distortion is within a range of −2.48% to +0.83%. The image pickup lens according to the fifth embodiment exhibits its excellent numerical values of a longitudinal spherical aberration, astigmatism and distortion because image values are close to the Y-axis in almost all fields.

A camera module including the above-described image pickup lens may be incorporated in various digital appliances, such as digital cameras, smart phones, laptop computers, tablet PCs and the like.

The above-described technical features may result in a compact high performance image pickup lens which is optimized in terms of constituent material, shape and power distribution.

As is apparent from the above description, the embodiments may provide an image pickup lens having a compact size and enhanced performance.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image pickup lens comprising:
a first lens, a second lens, and a third lens arranged in sequence from an object side to an image side along an optical axis,
wherein the first lens to the third lens are formed of the same material,
wherein the third lens has a negative power,
wherein a radius of curvature of an object surface of the third lens at the optical axis has a negative value, and
wherein the image pickup lens satisfies the following equation 2, equation 3, and equation 6:

$0.8 < f/f2 < 1.5$                      <Equation 2> where, f is a focal distance of the entire optical system and f2 is a focal distance of the second lens, $-1.6 < f/f3 < -0.5$                      <Equation 3> where, f is a focal distance of the entire optical system and f3 is a focal distance of the third lens, $-0.4 < R6/R5 < 0.2$                      <Equation 6> where, R5 is the radius of curvature of the object surface of the third lens and R6 is a radius of curvature of an image surface of the third lens.

2. The image pickup lens according to claim 1, wherein the first lens is biconvex.

3. The image pickup lens according to claim 1, wherein the second lens is a positive meniscus lens.

4. The image pickup lens according to claim 1, wherein the first lens to the third lens have the same index of refraction.

5. The image pickup lens according to claim 1, wherein at least one of the first lens to the third lens is a plastic lens.

6. The image pickup lens according to claim 1, wherein at least one of the first lens to the third lens has one or both aspherical surfaces.

7. The image pickup lens according to claim 1, further comprising a stop provided between the first lens and the second lens.

8. The image pickup lens according to claim 1, wherein the image pickup lens satisfies the following equation 1:

$$0.7<f/f1<1.6 \qquad \text{<Equation 1>}$$

where, f is a focal distance of the entire optical system and f1 is a focal distance of the first lens.

9. The image pickup lens according to claim 1, wherein the image pickup lens satisfies the following equation 4:

$$0.5<R1/f<0.7 \qquad \text{<Equation 4>}$$

where, R1 is a radius of curvature of an object surface of the first lens and f is a focal distance of the entire optical system.

10. The image pickup lens according to claim 1, wherein the image pickup lens satisfies the following equation 7:

$$0.6<\tan\theta<0.8< \qquad \text{Equation 7>}$$

where, θ is a half field angle of a maximum image height.

11. An image pickup lens comprising:
a first lens, a second lens, and a third lens being arranged in sequence from an object side to an image side along an optical axis,
wherein the first lens to the third lens are formed of the same material,
wherein the third lens has a negative power,
wherein a radius of curvature of an object surface of the third lens at the optical axis has a negative value,
wherein the image pickup lens satisfies the following equation 5, equation 6, and equation 7:

$$-0.06<R1/R2<-0.01 \qquad \text{<Equation 5>}$$

where, R1 is a radius of curvature of an object surface of the first lens and R2 is a radius of curvature of an image surface of the first lens, $$-0.4<R6/R5<0.2 \qquad \text{<Equation 6>}$$

where, R5 is the radius of curvature of the object surface of the third lens and R6 is a radius of curvature of an image surface of the third lens, $$0.6<\tan\theta<0.8< \qquad \text{Equation 7>}$$

where, θ is a half field angle of a maximum image height.

12. The image pickup lens according to claim 11, wherein power of the second lens is greater than power of the first lens and the third lens.

13. The image pickup lens according to claim 11, wherein the first lens is a positive power lens, and the first lens is biconvex.

14. The image pickup lens according to claim 11, wherein the second lens is a positive power lens.

15. An image pickup lens comprising:
a first lens, a second lens, and a third lens being arranged in sequence from an object side to an image side along an optical axis,
wherein the third lens has a negative power,
wherein a radius of curvature of an object surface of the third lens at the optical axis has a negative value,
wherein the image pickup lens satisfies the following equation 2, equation 3, and equation 6:

$$0.8<f/f2<1.5 \qquad \text{<Equation 2>}$$

where, f is a focal distance of the entire optical system and f2 is a focal distance of the second lens, $$-1.6<f/f3<-0.5 \qquad \text{<Equation 3>}$$

where, f is a focal distance of the entire optical system and f3 is a focal distance of the third lens, $$-0.4<R6/R5<0.2 \qquad \text{<Equation 6>}$$

where, R5 is the radius of curvature of the object surface of the third lens and R6 is a radius of curvature of an image surface of the third lens.

16. A camera module comprising:
an image pickup lens including a first lens, a second lens, and a third lens arranged in sequence from an object side to an image side along an optical axis, and wherein the first lens to the third lens are formed of the same material;
wherein the third lens has a negative power,
wherein a radius of curvature of an object surface of the third lens at the optical axis has a negative value,
a filter; and
a light receiving device configured to receive light having passed through the filter,
wherein the image pickup lens satisfies the following equation 2, equation 5, and equation 6:

$$0.8<f/f2<1.5 \qquad \text{<Equation 2>}$$

where, f is a focal distance of the entire optical system and f2 is a focal distance of the second lens, $$-0.06<R1/R2<-0.01 \qquad \text{<Equation 5>}$$

where, R1 is a radius of curvature of an object surface of the first lens and R2 is a radius of curvature of an image surface of the first lens, $$-0.4<R6/R5<0.2 \qquad \text{<Equation 6>}$$

where, R5 is the radius of curvature of the object surface of the third lens and R6 is a radius of curvature of an image surface of the third lens.

17. The image pickup lens according to claim 1, wherein the radius of curvature of the image surface of the third lens has a positive value.

18. The image pickup lens according to claim 11, wherein the image pickup lens satisfies the following equation 2:

$$0.8<f/f2<1.5 \qquad \text{<Equation 2>}$$

where, f is a focal distance of the entire optical system and f2 is a focal distance of the second lens.

19. The image pickup lens according to claim 15, wherein the image pickup lens satisfies the following equation 7:

$$0.6<\tan\theta<0.8< \qquad \text{Equation 7>}$$

where, θ is a half field angle of a maximum image height.

20. The image pickup lens according to claim 15, wherein the image pickup lens satisfies the following equation 5:

$$-0.06<R1/R2<-0.01 \qquad \text{<Equation 5>}$$

where, R1 is a radius of curvature of an object surface of the first lens and R2 is a radius of curvature of an image surface of the first lens.

21. The image pickup lens according to claim 16, wherein the image pickup lens satisfies the following equation 3:

$$-1.6 < f/f3 < -0.5 \quad \text{<Equation 3>}$$

where, f is a focal distance of the entire optical system and f3 is a focal distance of the third lens.

22. An image pickup lens comprising:
a first lens, a second lens and a third lens arranged in sequence from an object side to an image side along an optical axis,
wherein the first lens to the third lens are formed of the same material,
wherein the third lens has a negative power,
wherein a radius of curvature of an object surface of the third lens at the optical axis has a negative value, and
wherein the image pickup lens satisfies the following equation 2, equation 5, and equation 6:

$$0.8 < f/f2 < 1.5 \quad \text{<Equation 2>}$$

where, f is a focal distance of the entire optical system and f2 is a focal distance of the second lens, $$-0.06 < R1/R2 < -0.01 \quad \text{<Equation 5>}$$

where, R1 is a radius of curvature of an object surface of the first lens and R2 is a radius of curvature of an image surface of the first lens, $$-0.4 < R6/R5 < 0.2 \quad \text{<Equation 6>}$$

* * * * *